United States Patent

Gross

[11] Patent Number: 5,386,350
[45] Date of Patent: Jan. 31, 1995

[54] MOUNTING FOR A SPOTLIGHT

[75] Inventor: William E. Gross, Chicago, Ill.

[73] Assignee: Unity Manufacturing Company, Chicago, Ill.

[21] Appl. No.: 109,085

[22] Filed: Aug. 19, 1993

[51] Int. Cl.[6] .............................................. B60Q 1/24
[52] U.S. Cl. ................................. 362/83.3; 362/428; 248/291; 248/298
[58] Field of Search ................. 248/291, 296, 298; 362/83.3, 66, 419, 422, 427, 428

[56] References Cited

U.S. PATENT DOCUMENTS

| 1,426,250 | 8/1922 | Boyer | 362/80 |
| 1,435,632 | 11/1922 | Cowles | 362/419 |
| 1,574,050 | 2/1926 | Montgomery | 362/66 |
| 1,702,772 | 2/1929 | Gross | 362/423 |
| 1,753,553 | 4/1930 | Deach | 248/296 |
| 1,816,233 | 7/1931 | Russell | 362/166 |
| 1,830,355 | 11/1931 | Farr | 362/424 |
| 1,940,348 | 12/1933 | Gross | 362/66 |
| 2,102,967 | 12/1937 | Neel et al. | 362/80 |
| 2,135,263 | 11/1938 | Sisson | 362/66 |
| 2,556,776 | 6/1951 | Oswald | 362/66 |
| 4,212,050 | 7/1980 | Trenkler | 362/66 |
| 4,353,110 | 10/1982 | Ellis | 362/66 |

OTHER PUBLICATIONS

Unity Manufacturing Co. spotlight mounting brochure dated Mar. 2, 1992.

Primary Examiner—Ira S. Lazarus
Assistant Examiner—Sara Sachie Raab
Attorney, Agent, or Firm—Willian Brinks Hofer Gilson & Lione

[57] ABSTRACT

A mounting for motor vehicles is disclosed. The mounting includes a bracket that is attached to the vehicle so that the spotlight can be mounted in a horizontal position. The mounting includes a support tube having a fixed bushing which positively engages the bracket so that the location of the handle is simply and easily fixed.

4 Claims, 1 Drawing Sheet

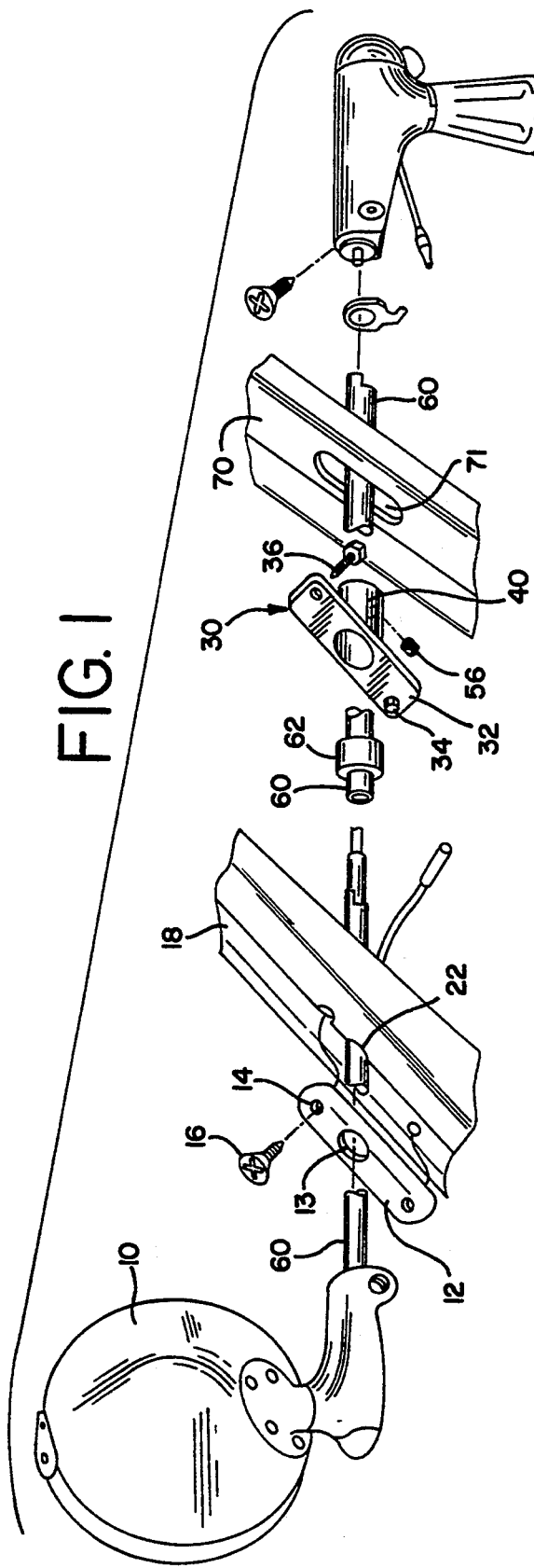
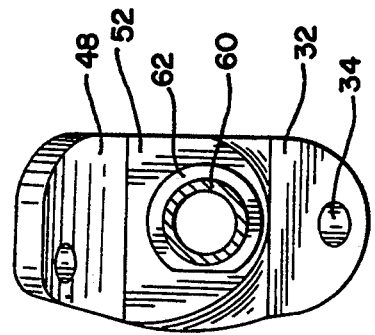
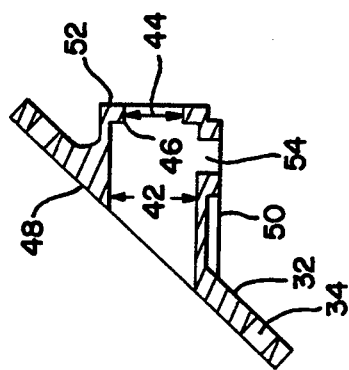
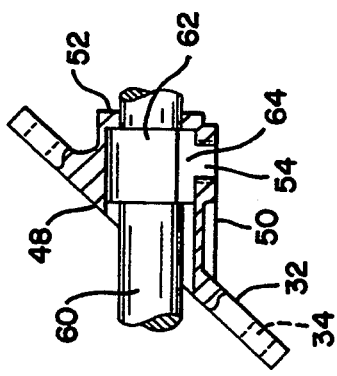

MOUNTING FOR A SPOTLIGHT

BACKGROUND OF THE INVENTION

The present invention relates to an improved mounting for spotlight especially for mounting a spotlight on the exterior of a motor vehicle such as an automobile or a track. Such a spotlight is shown and described in U.S. Pat. No. 1,702,772 which is incorporated herein by reference in its entirety.

Spotlights can be installed by the manufacturer of the motor vehicle. Many spotlights, however, are installed by the retailers or the dealers for the end users. For example, an automobile dealer may install the spotlight in a number of cars to be sold to a police department. In addition, consumers who desire to have a spotlight may wish to install the spotlight themselves.

By use of the present invention, the mounting of a spotlight is accomplished simply and easily to insure the accurate positioning of the spotlight so that the arc or swing of the light can be easily defined. More importantly, the position of the handle for the spotlight is easily fixed so that the handle does not interfere with the steering wheel, the swinging of the door, or the vision of the driver.

Spotlight mountings can be mounted to the exterior of the motor vehicle such as on the corner post, cowl, door, side, roof, and the like. One problem is that the area on, for example, an automobile, suitable for mounting a spotlight continues to decrease due to the increase in the aerodynamic shape of the automobile. In particular, mounting spotlights on corner posts presents a difficulty because the angle of the corner post as well as the area in which to mount the spotlight has become smaller. These reductions in the area and the angle of the corner post also reduces the amount of room available in the interior of the automobile for the handle of the spotlight.

Another problem with known spotlight mountings is that the installer has to make a number of adjustments to properly mount the spotlight. If the adjustment is not made correctly a failure of the spotlight and mounting may result. Yet another problem with known spotlight mountings is that the handle portion, which is normally within the interior of the motor vehicle, may be forced further inward by an impact to the light interfering with the operation of the steering wheel or causing injury to a person sitting adjacent the handle.

Accordingly, there is a need for a mounting for a spotlight which can be installed on a motor vehicle so that the position of the handle is simply and easily fixed without detrimentally affecting the operation and safety of the automobile and the people inside.

SUMMARY OF THE INVENTION

The present invention provides a spotlight mounting for a motor vehicle that comprises a bracket, a support tube, and a fixed bushing. The bracket has a tube guide to receive the support tube and has a pair of ears extending from the guide to receive an attaching member such as a screw, bolt, and the like for attaching the bracket to the vehicle. The guide has a first and second diameter with the first diameter being positioned relative to the second diameter, closer to the exterior of the vehicle and being greater than the second diameter.

The support tube extends through the tube guide so that when the bracket is mounted on the vehicle, a portion of the tube extends out of the vehicle and a portion extends into the interior of the vehicle. A bushing is fixed on the support tube, preferably closer to the end of the tube extending into the interior of the vehicle. The outer diameter of the bushing is slightly smaller than the first diameter of the guide and larger than the second diameter of the guide so that the bushing is received by the first diameter and extends into the guide until it contacts the second diameter. As a result the support tube is securely received in the bracket and the length of the support tube extending into the interior of the vehicle is fixed. Advantageously, the support tube can not be forced further into the interior of the car due to the positive stop provided by the second diameter of the tube guide.

Preferably, a retaining member that extends into the first diameter to contact a dimple or detent provided on the bushing is used to securely retain the bushing and thus the support tube in position.

In a preferred embodiment of the present invention, a spotlight mounting is provided for mounting the spotlight on an angled portion of the vehicle so that the spotlight has a substantially horizontal orientation. In this preferred embodiment, the bracket is substantially triangular shaped and has a horizontal face, a vertical face, and an angled face. The bracket has a tube guide defining an aperture extending from the vertical face to the angled face. Preferably, the tube guide is substantially circular. The tube guide has a first diameter and a second diameter, with the first diameter being greater than the second diameter. The first diameter extends a portion of the distance from the angled face to the vertical face so that a stop is created by the second diameter.

The bracket has ears extending from the angle face with apertures provided to receive an attaching member so that when the angled face contacts the angled portion of the vehicle, the bracket can be attached to the vehicle.

A support tube with two ends and having a diameter slightly smaller than the first and second diameter of the tube guide is provided so that the spotlight can be mounted on one end and the handle on the other end of the support tube. A bushing is fixed near the handle end of the support tube. Preferably, the support tube and the bushing are substantially circular. When the support tube is extended through first diameter and the second diameter of the tube guide in the direction from the angled face to the vertical face, the bushing positively mates with the first diameter and contacts a stop defined by the second diameter to secure the support tube.

By fixing the bushing at an appropriate distance from the handle end of the support tube, the spotlight can be mounted simply and accurately so that when the bracket is mounted on, for example, the driver's side of the vehicle and when the handle is attached to the support tube, the handle will not disrupt the driver's ability to steer or present a danger to the driver. Importantly, because the bushing is fixed at a predetermined distance from the handle end, the handle will not affect the opening and closing movement of the door.

BRIEF DESCRIPTION OF THE DRAWINGS

FIG. 1 is an exploded view showing the relationship of the preferred embodiment of a mounting of the present invention to other spotlight components and the corner post of an automobile.

FIG. 2 is a cross sectional view of the of FIG. 1 with the support tube inserted bracket.

FIG. 3 is a view of the bracket of FIG. 1 from the angled face.

FIG. 4 is a view of the bracket of FIG. 1 showing the first diameter and the brushing in the shape of a D.

DETAILED DESCRIPTION OF THE INVENTION AND PREFERRED EMBODIMENTS

FIG. 1 illustrates a preferred embodiment of the mounting of the present invention together with other elements of a spotlight assembly. Generally, as shown in FIG. 1, the spotlight 10 is mounted to one end of the support tube 60 which extends through, in turn, the hole 22 in the corner post 18, the mounting bracket 30, and the hole 71 in the garnish molding 70. A handle 72 is mounted at the other end of the support tube 60 so that the spotlight can be manipulated by the driver from the inside of the automobile. Spotlights that can be manipulated by a handle are shown and described in U.S. Pat. No. 1.702.772 which is incorporated herein by reference in its entirety.

In this preferred embodiment, the spotlight is to be mounted on the corner post 18 of the automobile which is a location most desired by police officers and other users of such spotlights. It is desired that the spotlight be oriented in a substantially horizontal position. The corner post 18, however, is at an acute angle. Accordingly, in order to mount the spotlight 10 onto the corner post 18, a mounting bracket 30 having a substantially triangular shape is provided. The bracket can be manufactured by any well known method including, but not limited to, machining, die casting and the like. Preferably, the bracket 30 is manufactured of one piece. The bracket 30 has a tube guide 40 with a pair of ears 32 extending from the tube guide 40. Each ear 32 has an aperture 34 to receive an attaching member 36, preferably a screw, so that the bracket can be securely fixed to, for example, the corner post 18.

As best seen in FIG. 2, the mounting bracket 30 has an angled race 48, which contacts the inside portion of the corner post 18, a horizontal face 50, and a vertical face 52. A substantially circular tube guide 40 defines an aperture that extends from the angled face 48 to the vertical face 52 parallel to the horizontal face 50. The tube guide 40 has a first diameter 42 and a second diameter 44, as best seen in FIG. 3, both being somewhat larger than the outer diameter of the support tube 60. Because the diameters of the tube guide 40 are somewhat larger than the outer diameter of the support tube 60, the insertion of the support tube 60 through the tube guide 40 is simplified. The first diameter 42 also has a diameter greater than the second diameter 44 of the tube guide 40 and extends a portion of the distance from the angled face 48 toward the vertical face 52. Thus, a stop 46 is defined at the juncture of the first and second diameters. The first diameter 42, can have any desired shape which may be dictated by manufacturing concerns. Preferably, the first diameter 42 is substantially circular, D-shaped, or hexagonal.

As described above, the spotlight 10 is mounted on one end of the support tube 60 with a handle 72 attached to the other end. The support tube 60 has a bushing 62 provided near the handle end of the support tube 60. The bushing 62 is secured to the support tube 60. The bushing 62 can be secured to the support tube 60 by any well known means including, but not limited to, sweating or soldering. Preferably, the bushing 62 is secured to the support tube 60 at a fixed position, as will be more fully described below.

The outer surface or circumference of the bushing 62 can have any desired shape as may be dictated by manufacturing concerns. The shape, however, must be substantially identical to the shape of the first diameter 42. Moreover, the outer diameter of the bushing 62 must be slightly smaller than the first diameter 42. In practice, the end of the support tube 60 to which the spotlight is to be mounted is inserted through the tube guide 40 in the direction of the angled face 48 toward the vertical face 52. The support tube 60 is inserted until the bushing 62, which has an outer diameter slightly smaller than the first diameter 42 but larger than the second diameter 44, contacts the stop 46. As a result, the handle end of the support tube 60 extends into the interior of the automobile a fixed and predetermined distance and the spotlight end extends outwardly from the automobile a fixed and predetermined distance.

When the bushing 62 and the first diameter 42 are circular, as shown in FIG. 3, it is desirable to provide a detent or dimple 64 in the outer surface of the bushing 62 and to provide a retaining member 56, preferably a screw, that extends into the first diameter 42 of the guide through a retaining aperture 54 provided on the mounting bracket 30. Thus, the retaining member 56, when tightened, will positively contact the dimple 64 on the bushing 62 to secure the support tube 60 from rotational and longitudinal movement.

In a more preferred embodiment, the first diameter 42 and the outer circumference bushing 62 are D-shaped. In this embodiment the support tube 60 is inserted through the tube guide 40, the first diameter 42 and the second diameter 44 until the bushing 62 contacts the stop 46 thus providing a fixed and predetermined length of support tube 60 extending into the interior of the automobile and a fixed and predetermined length of support tube 60 extending out of the automobile. It will be appreciated that because both the bushing 62 and the first diameter 42 are D-shaped, they will positively mate to prevent the support tube 60 from rotational movement and longitudinal movement in a selected direction. Of course, where the bushing 62 and the first diameter 42 have a shape other than circular, the bushing 62 will positively mate with the first diameter 42 to prevent the support tube 60 from rotational movement.

Even if the bushing 62 has a shape other than circular, it may be desirable to provide a retaining member 56 as described above to further insure against longitudinal movement of the support tube 60 in both directions. For example, if the bushing 62 has a D-shape, the retaining member 56 preferably contacts the flat of the bushing 62.

A handle 72 is attached to the end of the support tube 60 opposite the spotlight 10. It is important that the location of the handle 72 inside the automobile not detrimentally affect the operation of the automobile and the safety of the driver. Accordingly, the handle 72 must not protrude so far into the automobile that it interferes with the steering or vision of the driver. In addition, the handle 72 should not affect the movement of the automobile door. More importantly, the handle should not be able to move further inwardly to cause injury to the driver as a result of an inward force on the spotlight 10 or support tube 60. Thus, in order to simply and easily establish the correct location for the handle 72, the bushing 62 is affixed onto the support tube 60 at a predetermined location. Consequently, when the bushing 62 contacts the stop 46, the length of the support tube 60 protruding into the automobile will be appropriate and fixed.

To mount the bracket 30 onto the corner post 18, the bracket is provided with ears 32 that extend from the tube guide 40. Each ear 32 is provided with an aperture 34 that receives an attaching member 36, for example, a screw, to attach or secure the bracket 30 to the corner post 18. The bracket 30 is mounted onto the corner post 18 at a location so that the tube guide 40 and the corner post hole 22 are aligned.

As described above, because the corner post 18 has a sharp angle and because it is desirable to have the spotlight mounted generally horizontal, the bracket 30 is substantially triangular shaped. In particular, the angle between the angled face 48 and the horizontal face 50 approximates the angle of the corner post 18 so that the tube guide 40 is substantially horizontal. Consequently, when the support tube 60 is received by the tube guide 40, the support tube 60 is substantially horizontal and thus, the spotlight can be mounted horizontally.

A retainer plate 12 having an aperture 13 to receive the support tube 60 can be attached to the outside of the corner post 18 to provide further support for the support tube 60. The retainer plate 12 may be attached to the corner post 18 by, for example screws 16 that extend through aligned apertures 14 and 20 in the retainer plate 12 and corner post 18, respectively.

Of course, it should be understood that a wide range of changes and modifications can be made to the embodiments described above. It is therefore intended that the foregoing description illustrates rather than limits this invention, and that it is the following claims, including all equivalents, which define this invention.

What is claimed:

1. A spotlight mounting for a vehicle comprising:
   a. a substantially triangular shaped mounting bracket having a horizontal face, a vertical face and an angle face, the bracket having a tube guide hole extending from the angle face to the vertical face, the guide hole having a first diameter and a second diameter with the first diameter being greater than the second diameter and extending a portion of the distance from the angle face to the vertical face creating a stop;
   b. a pair of ears extending from the angle face with each ear having an aperture to receive an attaching member;
   c. a support tube with two ends and having a diameter slightly smaller that the second diameter with a first end adapted to have a spotlight mounted thereon and a second end adapted to have a handle attached; and,
   d. a bushing fixed to the support tube near the second end, the outer circumference of the bushing having a shape substantially similar to the first diameter such that when the support tube is extended through the guide hole in the direction from the angle face toward the vertical face, the bushing contacts the stop and positively mates with the first diameter to secure the support tube.

2. The mounting of claim 1 wherein the first diameter and the bushing are in the shape of a D so that bushing positively mates with the first diameter to secure the support tube from rotational movement.

3. The mounting of claim 1 wherein the bracket further has a retaining aperture extending normal to and into the space defined by the first diameter and a retaining member extending through the retaining aperture to contact a detent provided on the bushing and secure the support tube from longitudinal movement.

4. A spotlight mounting for a vehicle comprising:
   a. a substantially triangular shaped mounting bracket having a horizontal face, a vertical face and an angle face, the bracket having a tube guide hole extending from the angle face to the vertical face, the guide hole having a first diameter and a second diameter with the first diameter being greater than the second diameter and extending a portion of the distance from the angle face to the vertical face creating a stop, the first diameter in the shape of a D;
   b. a pair of ears extending from the angle face with each ear having an aperture to receive an attaching member;
   c. a support tube with two ends and having a diameter slightly smaller than the second diameter with a first end adapted to have a spotlight mounted thereon and a second end adapted to have a handle attached; and,
   d. a bushing fixed to the support tube near the second end, the outer circumference of the bushing in the shape of a D such that when the support tube is extended through the guide hole in the direction from the angle face toward the vertical face, the bushing contacts the stop and positively mates with the first diameter to secure the support tube.

* * * * *

UNITED STATES PATENT AND TRADEMARK OFFICE
CERTIFICATE OF CORRECTION

PATENT NO. : 5,386,350
DATED : January 31, 1995
INVENTOR(S) : William E. Gross

It is certified that error appears in the above-indentified patent and that said Letters Patent is hereby corrected as shown below:

Col. 6:
In claim 1, line 2, delete "that" and substitute --than--.

In claim 3, line 23, after "from" insert --at least--.

Signed and Sealed this

Fourth Day of July, 1995

Attest:

BRUCE LEHMAN

Attesting Officer         Commissioner of Patents and Trademarks